(No Model.)
A. E. HOWARD.
CHECKREIN ATTACHMENT.
No. 428,914. Patented May 27, 1890.
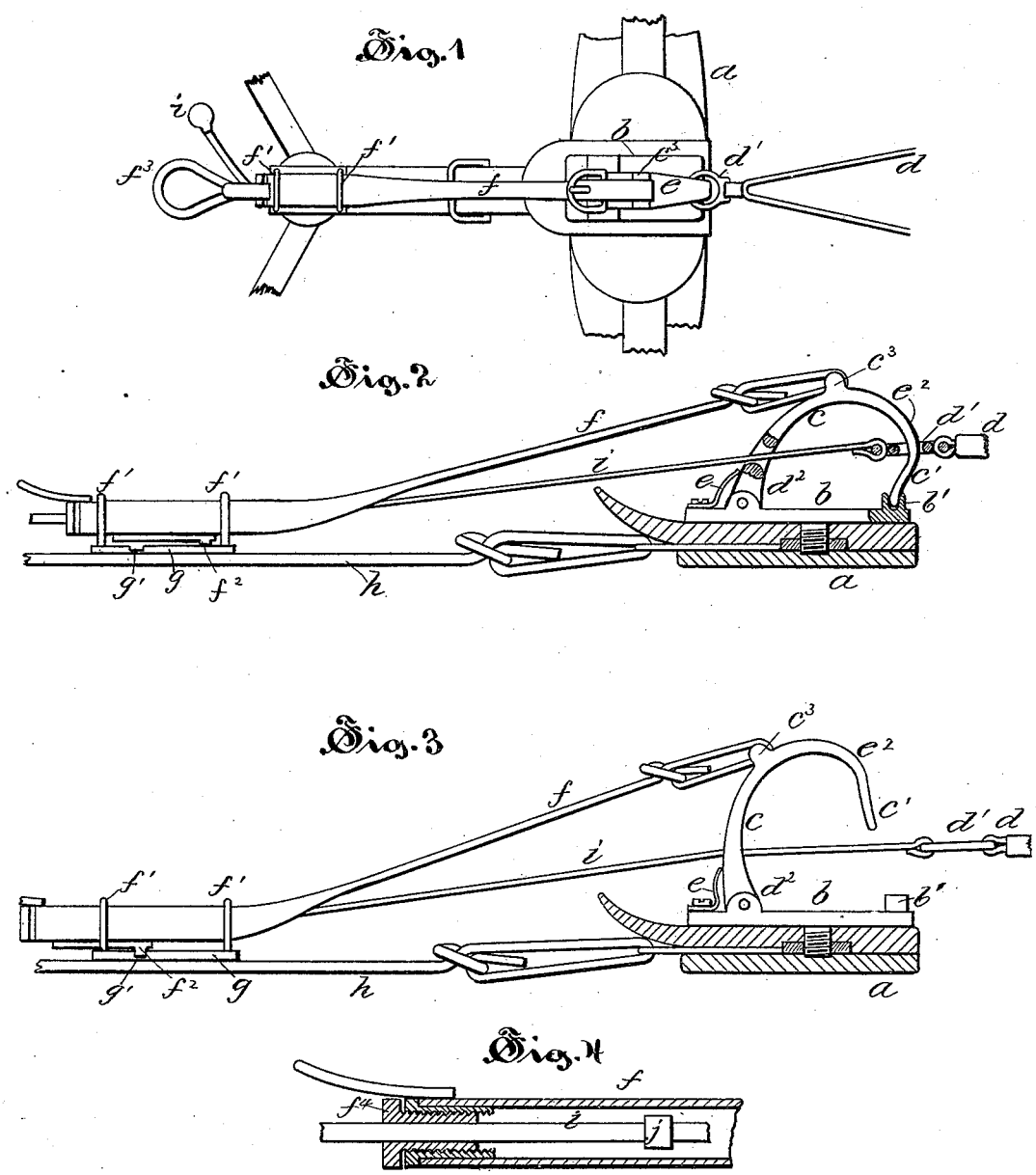
Witnesses:
Harry P. Williams
Arthur B. Jenkins
Inventor
Alfred E. Howard,
by Simonds & Burdett,
Attorneys

UNITED STATES PATENT OFFICE.

ALFRED E. HOWARD, OF BURNSIDE, CONNECTICUT.

CHECKREIN ATTACHMENT.

SPECIFICATION forming part of Letters Patent No. 428,914, dated May 27, 1890.

Application filed January 14, 1890. Serial No. 336,944. (No model.)

*To all whom it may concern:*

Be it known that I, ALFRED E. HOWARD, of Burnside, in the county of Hartford and State of Connecticut, have invented certain new and useful Improvements in Checkrein Attachments, of which the following is a full, clear, and exact description, whereby any one skilled in the art can make and use the same.

The object of my invention is to produce a device by means of which the checkrein usually employed to keep a horse's head in a raised position may be released from the turret-hook and afterward refastened without compelling the driver to leave his seat.

To this end my invention consists in the combination of the checkrein-hook and the rein-releasing device, and in details of the apparatus making up the device as a whole, as more particularly hereinafter described, and pointed out in the claims.

Referring to the drawings, Figure 1 is a diagram top view of a harness, illustrating the manner of attaching my improved device to it. Fig. 2 is a detail side view, on an enlarged scale, of the attachment with parts cut away to show construction. Fig. 3 is a detail view of the turret-hook and the parts immediately connected, showing the hook open. Fig. 4 is a detail view in section of the end of the trip-strap, showing the checkrein-stop.

In the accompanying drawings, the letter $a$ denotes the saddle, that may be of ordinary construction; $b$, the plate, of suitable metal, secured to the upper central part of the saddle in the usual position to support a turret. In place of the usual form of turret-hook there is a swinging hook $c$, pivoted to the plate at $d^2$, and having its free end $c'$ projecting into a socket $b'$ in the plate. This hook is preferably curved, so as to have a forwardly extending bend $e^2$, into which the ring $d'$ of the checkrein $d$ will be drawn by the strain upon the rein when the horse is checked up. The hook $c$ is held in the closed position by means of a spring $e$, that is fastened to the base-plate and thrusts forward against the hook, tending to keep it in the closed position.

To the top of the hook a trip-strap $f$ is attached, as by passing the end of the strap through a loop $c^3$ on the upper part of the hook and turning the end backward into a buckle, as shown in Fig. 2 of the drawings. This trip-strap is tubular for the greater part of its length and extends backward along the center of the back of the horse, being attached to the harness part by rings $f'$, that hold it against lateral play, but permit it to have a sliding longitudinal movement. Between the clamping-rings $f'$ the underneath part of this trip-strap $f$ has a lug $f''$, that takes into a socket $g'$ in the check-plate $g$, that is secured to the back-strap $h$ of the harness. The extreme rear end of the trip-strap bears a handle $f^3$, of any convenient shape, that is located just over the tail of the horse or any other convenient position to enable the driver to reach it so as to pull back upon the strap.

The checkrein $d$ has attached to it back of the ring $d'$ an extension-piece or cord $i$, preferably round, and comparatively small in diameter, and this extension-piece or cord is led backward, as through openings in the hook and spring, through the tubular part of the trip-strap and through the rear end, beyond which it protrudes a required distance. Within the tubular part of the trip-strap there is adjustably secured to the cord a stop $j$, that is secured to it, as by means of a clamp-screw, in such position that when the cord is pulled backward a certain distance the stop will strike the screw-plug $f^4$, that is secured in a threaded socket in the back end of the tubular part of the strap, and indicate to the driver that the ring $d'$ is in proper position with respect to the hook to enable the latter to be dropped through the ring so as to hold it.

The method of using my device is as follows: The several parts of the device having been connected up, as shown in Fig. 1 of the drawings, a pull upon the trip-strap $f$ lifts the hook and releases the checkrein, so that the horse can reach his head forward. In thus reaching the head forward the extension part or cord $i$ is drawn forward through the tubular part of the trip-strap and the guides at the hook, and as soon as it is desired to check the horse again the handle $i'$ at the end of the cord $i$ is grasped and the latter pulled backward until the stop $j$ encounters the plug $f^4$ in the end of the tubular part of the trip-strap. By a slight pull upon the handle $f^3$ the lug $f''$ is disengaged from the socket $g'$ in the catch-plate, and the hook is thrown forward by the impulse of the spring $e$, the contact of the stop $j$ with the shoulder or plug in the strap indicating when the ring $d'$ has reached the proper position for dropping the hook through the ring.

I claim as my invention—

1. In combination with the checkrein having a loop adapted to engage the hook, the swinging holding-hook mounted on the saddle and with its forward end entering a socket on the hook-base, the trip-strap attached to the hook, tubular for a part of its length and bearing a perforated plug, the trip-strap guides on the harness, and the checkrein-extension leading rearward, passing through the tubular part of the trip-strap, and bearing an adjustable stop, all substantially as described.

2. The combination, with the checkrein having a loop adapted to engage the hook, the swinging holding-hook mounted on the saddle and with its forward end entering a socket on the hook-base, the trip-strap attached to the hook, tubular for a part of its length and bearing a perforated plug, the trip-strap guides on the harness, the trip-strap catch on the harness and trip-strap, and the checkrein-extension leading rearward, passing through the tubular part of the trip-strap, and bearing an adjustable stop, all substantially as described.

ALFRED E. HOWARD.

Witnesses:
CHAS. L. BURDETT,
A. B. JENKINS.